United States Patent [19]

Tsao et al.

[11] Patent Number: 4,519,452
[45] Date of Patent: May 28, 1985

[54] METHOD OF DRILLING AND CEMENTING A WELL USING A DRILLING FLUID CONVERTIBLE IN PLACE INTO A SETTABLE CEMENT SLURRY

[75] Inventors: Yuh-hwang Tsao; George G. Binder, Jr., both of Houston, Tex.

[73] Assignee: Exxon Production Research Co., Houston, Tex.

[21] Appl. No.: 615,851

[22] Filed: May 31, 1984

[51] Int. Cl.³ .................... E21B 33/14; E21B 36/04
[52] U.S. Cl. .................................. 166/288; 166/293
[58] Field of Search ................... 166/288, 292, 293

[56] References Cited

U.S. PATENT DOCUMENTS

| | | | |
|---|---|---|---|
| 2,705,050 | 3/1955 | Davis | 166/293 |
| 3,168,139 | 2/1965 | Kennedy | 166/292 |
| 3,302,715 | 2/1967 | Smith et al. | 166/288 |
| 3,499,491 | 3/1970 | Wyant | 166/292 |
| 3,557,876 | 1/1971 | Tragesser | 166/292 |
| 3,581,825 | 6/1971 | Messenger | 166/288 |
| 3,605,898 | 9/1971 | Harrison | 166/293 |
| 3,990,903 | 11/1976 | Mallow | 166/292 X |
| 4,176,720 | 12/1979 | Wilson | 166/293 |

FOREIGN PATENT DOCUMENTS 1070936  2/1980  Canada .

Primary Examiner—George A. Suchfield
Attorney, Agent, or Firm—James H. Riley

[57] ABSTRACT

A method of drilling and cementing a well using a novel drilling fluid convertible in place by the extrinsic application of heat into a settable cement slurry and composition therefor. The novel drilling fluid comprises an aqueous drilling mud containing in intimate admixture therewith cement and a thermally deactivatable defloculant which prevents the cement from setting while the fluid is being used as a drilling mud. The method comprises drilling a well with a rotary bit through which the novel drilling fluid is circulated; suspending a casing in the well; removing the fluid from inside the casing; and applying sufficient extrinsic heat to the fluid in place in the annulus of the well to deactivate the deflocculant, thereby converting the fluid in place into a settable cement slurry.

12 Claims, 2 Drawing Figures

U.S. Patent     May 28, 1985     4,519,452
FIG. 1
FIG. 2
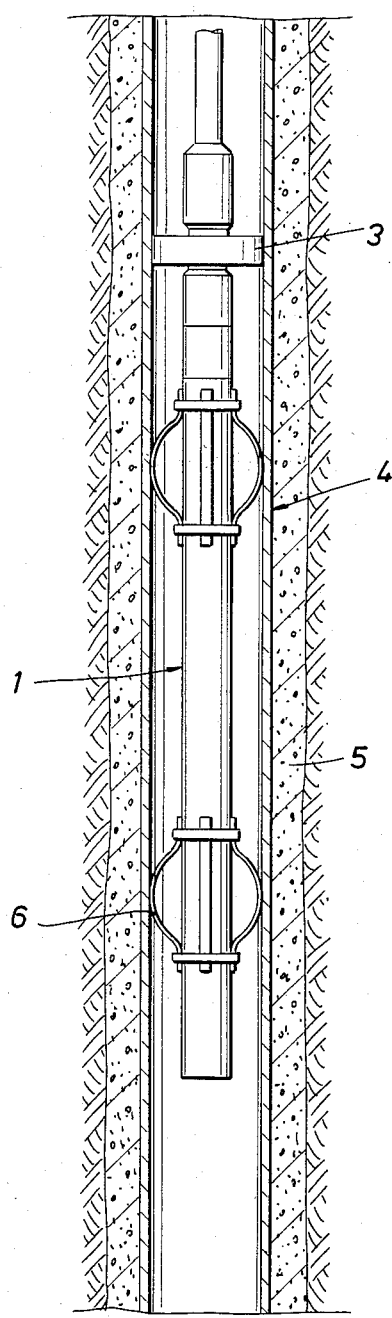
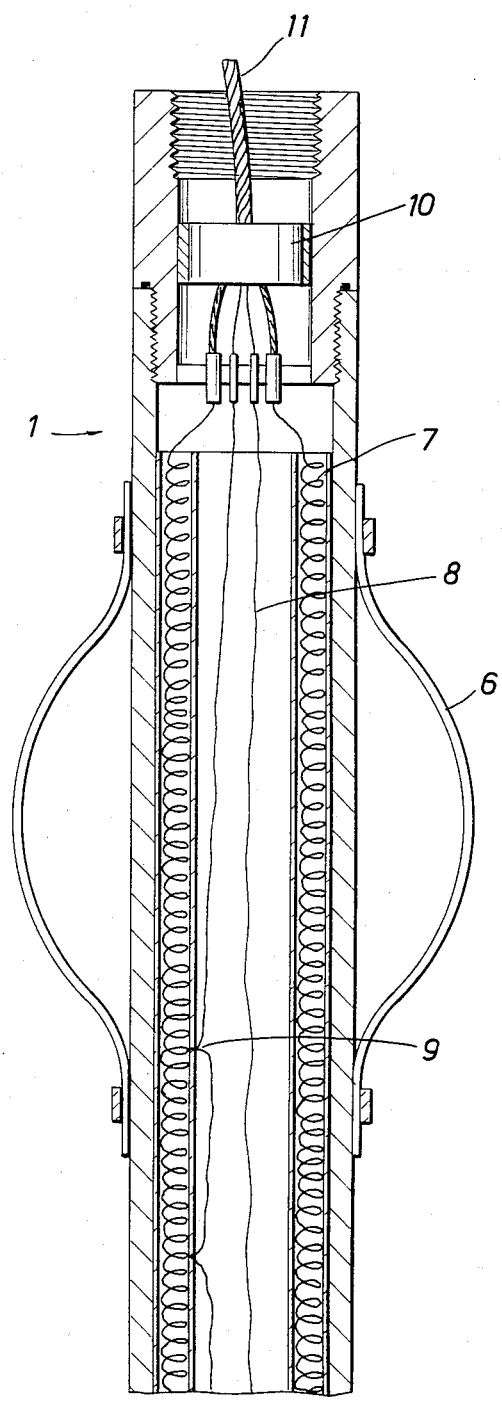

METHOD OF DRILLING AND CEMENTING A WELL USING A DRILLING FLUID CONVERTIBLE IN PLACE INTO A SETTABLE CEMENT SLURRY AND COMPOSITION THEREFOR

This invention relates to the drilling and cementing of a well using a drilling fluid which functions as a drilling mud during drilling operations and which, upon conclusion of drilling, is convertible in place into a settable cement slurry by application of extrinsic heat.

BACKGROUND OF THE INVENTION

Typically, in the rotary drilling of a well, one fluid is used to drill the well, a drilling mud, and another fluid, a cement slurry, is used to cement the casing or liner into the well. For simplicity, the term "casing" will be used to refer to both the well casing and the well liner.

The drilling mud, consisting of liquids and solids, is circulated down the drill pipe, past the bit, and back to the surface through the annulus between the drill pipe and the borehole. The drilling mud functions primarily to clean the borehole by suspending and lifting formation cuttings to the surface, to cool the drill bit, to lubricate the drill string, and to seal the formations penetrated by the drill bit to prevent the escape of fluids therefrom. Throughout the drilling operation, the proper functioning of the mud is constantly monitored by controlling the mud weight, viscosity and gel strength, and controlling filtrate loss.

The weight of the drilling mud is important in preventing a blowout. The mud density must be high enough to counterbalance the pressure of the subterranean fluids with the hydrostatic head of the drilling mud in the well. Mud density is controlled primarily by regulating the solids content of the mud. In weighted muds, a material, such as barite, is added to increase the mud weight and keep it within tolerable limits.

The drilling mud must have a viscosity which permits circulation at high rates without excessive pump pressures. On the other hand, the drilling mud must be viscous enough to carry the drill cuttings to the surface. Closely related to the viscosity is the mud gel strength. The gel strength is indicative of the mud's tendency to thicken during periods of interrupted circulation. It must be high enough to suspend the barite and drilling chips and prevent them from settling during periods in which circulation of the mud is interrupted. If the gel strength is too high, it may be difficult to reestablish circulation. Moreover, when pulling drill pipe from the well, a high viscosity or gel strength results in a swabbing action which reduces the pressure in the well and may possibly result in a blowout. The viscosity and gel strength may be increased by adding bentonite, flocculating the clay solids or adding specially formulated additives. The viscosity and gel strength may be reduced by diluting with water or adding chemical thinners. Generally, most commonly used viscosifiers tend to increase the attraction between suspended particles while thinners tend to reduce the attraction.

Controlling filtrate loss is another important function of the drilling mud. When the borehole enters a permeable formation, the filtrate flows into the formation. To control the filtrate loss, the drilling mud should contain particles of varying size which will form a filter cake on the wall of the borehole. The filter cake should have a low permeability so that it will be relatively thin and will not impede the raising, lowering or rotating of the drill pipe.

Typically, after the well has been drilled to a desired depth, a permanent casing is strung in the hole and cemented in place. Cementing is accomplished by pumping a cement slurry down the casing and up the annular space behind the casing where it is allowed to set, thus bonding the casing to the formation. The primary functions of cementing are to seal the formation and the wellbore to prevent escape and communication of subterranean fluids and to protect the casing. As with the drilling mud, the cement slurry must have the proper density, viscosity and filtrate loss properties.

An additional consideration is the cement setting time. If the setting time is too short, the cement may set before it is properly in place. On the other hand, the setting time should not be any longer than necessary because of the delay in drilling activity.

Still another consideration in cementing operations is to obtain a complete displacement of the drilling mud and filter cake in place in the well annulus by the cement slurry. A primary problem in the cementing operation is the effective removal of drilling mud and filter cake during cementing operations. Inadequate displacement of the drilling mud and filter cake will leave channels of gelled mud and filter cake remaining in the annulus after the cement is in place. The channels of mud and filter cake remaining in the annulus may greatly reduce the effectiveness of the cementing operation. Moreover, the mud and filter cake may contain components which contaminate the cement slurry as it displaces the mud and consequently delay or prevent the setting of the cement, or reduce the strength of the set cement. Further, a thick filter cake deposited by the mud on the borehole walls presents an inadequate surface for cement bonding and an inadequate barrier to prevent communication among permeable strata separated by impermeable strata.

Usually, different fluids are used as drilling muds and cement slurries. Several problems have been associated with this practice. Mixing between the cement and the mud as the cement is put in place may have deleterious effects on the cement. Inadequate displacement of the mud or filter cake by the cement may result in an ineffective or shortlived seal between formations. Delay in changing from drilling mud to cement may result in the mud gelling, exacerbating the problems of in-place cement-mud mixing and cement channeling. Moreover, using separate fluids for the drilling mud and the cement slurry may require the additional use of scarce resources, such as water, and pose the additional problem of disposing of the drilling mud.

One attempt at eliminating the problems of using two separate fluids for drilling and cementing is disclosed in U.S. Pat. No. 3,168,139 issued to Kennedy in which a drilling mud is converted to a cement slurry by mixing the cement and water with the aqueous drilling mud at the surface prior to its recirculating down the borehole. While the drilling mud is used as a component of the cement slurry, the mud containing cement slurry cannot be further used as a drilling mud once the cement has been added since the mud containing cement slurry cannot be prevented from setting. Furthermore, the filter cake does not contain the newly added cement and cannot be set. Therefore, while the problems of cement-mud mixing and mud channeling may be reduced by Kennedy's method, they are not completely eliminated.

Another attempt at using the drilling mud as a component in the cement slurry is disclosed in U.S. Pat. No. 3,499,491 issued to Wyant. This patent discloses the combination of drilling mud with hydraulic cement and sodium silicate glass to form a mud concrete. Like the procedure of Kennedy, the Wyant patent requires the addition of cement and additives to the drilling mud to make a cement slurry which thereafter is no longer useful as a drilling mud.

A chemically convertible drilling fluid is disclosed in U.S. Pat. No. 3,557,876 issued to Tragesser. This patent discloses a drilling fluid comprising water, clay and pozzolan which is convertible to cement at the conclusion of the drilling operation by admixing therewith an alkaline earth hydroxide. U.S. Pat. No. 3,605,898 issued to Harrison discloses an aqueous hydraulic cement slurry containing heptolactone which may be used as a well circulation fluid. This cement composition requires the addition and admixture therewith of a polyvalent metal salt, such as calcium chloride, to promote setting. As with the other attempts, both Tragesser's and Harrison's cement require the mixing of a chemical additive therewith and the problems of in-place cement-mud mixing and mud channeling are not totally eliminated.

In contrast, the present invention does not require the admixture of any additional components to the drilling fluid to effect conversion of the fluid to a settable cement slurry, and the problems of in-place cement-mud mixing and mud channeling are eliminated. Further, since the fluid of the invention is convertible to cement without the requirement for subsequently admixing a separate hardening component, the filter cake deposited on the formation face by the fluid during its use as a drilling mud will also be converted to cement, thus an effective seal of the formation will be accomplished and a surface provided to which the bulk body of the cement may be strongly adhered.

SUMMARY OF THE INVENTION

In its broadest aspect, this invention provides a method of drilling and cementing a well using a drilling fluid which when desired is convertible in place upon the application of extrinsic heat to a settable cement slurry. The method of this invention comprises drilling a well with a rotary bit through which the novel drilling fluid is circulated, the drilling fluid comprising an aqueous drilling mud containing in intimate admixture cement and a deflocculant which is deactivated by exposure to heat; suspending a casing in the well; removing the fluid from inside the casing; and, applying sufficient extrinsic heat to the fluid in place in the annulus between the borehole and casing to deactivate the deflocculant to convert the fluid in place in the annulus into a settable cement slurry.

This invention also provides a novel drilling fluid composition which has the rheological properties required for use as a drilling mud during drilling operations and yet, when desired, may be thermally activated to become a settable cement slurry. The novel drilling fluid comprises an aqueous drilling mud containing in intimate admixture therewith cement and a thermally deactivatable deflocculant.

In describing the method and fluid of this invention, it is desirable to refer to the well fluid as either a drilling fluid or mud or as a cement slurry. It is intended that all of these terms refer to the dual-purpose well fluid used in its particular context, and the terms are used interchangeably herein to refer to the same fluid.

BRIEF DESCRIPTION OF THE DRAWING

FIG. 1 shows a side view of a heater tool which may be employed to provide the extrinsic heat required to convert the novel drilling fluid into a settable cement slurry. The figure illustrates the tool while suspended in the casing of the well which is to be cemented in place.

FIG. 2 shows a sectional and partially cutaway view of the heater tool in FIG. 1.

DETAILED DESCRIPTION OF THE PREFERRED EMBODIMENTS

The novel drilling fluid useful in the practice of this invention comprises an aqueous drilling mud component to which cement and a heat deactivated deflocculant have been added in intimate admixture. The drilling mud component of the fluid may be a fresh or salt water based mud containing non-reactive solids such as sand, chart, limestone, dolomite, shales or other mineral mixtures typically incorporated into the mud during drilling; non-reactive solids such as barite (primarily barium sulfate); or reactive clays such as bentonite (sodium montmorillonite), salt gel (attapulgite) or the like. The solids content by volume of the drilling mud component will, of course, be determined by the conditions of the formation being drilled, and, depending upon the solids type selected for use, may readily be determined according to the conventional practice employed for preparing drilling muds.

The drilling fluid useful in the method of this invention must contain cement. The term cement as used herein refers to all API classes of oil well cements, including all mixtures of lime, silica, alumina, magnesia, and/or iron oxide, or combinations thereof. The cement may be lime, grappier cements, pozzolan cements, natural cements, calcium sulfate or gypsum cements, portland cements or any material commonly classified as a cement which is useful in cementing a casing in a well. The preferred cement is portland cement because a hardened slurry of portland cement has a high compressive strength.

The cement is present in the drilling fluid of this invention in an amount varying from about 2 to about 100 pounds per barrel of the mud component, depending on the particular conditions of the well such as the types of formations, the desired properties of the drilling fluid, and the desired properties of the hardened cement. A fluid containing cement ranging from about 5 to about 50 pounds per barrel of mud component is preferred.

A heat deactivatable deflocculant is another essential element of the drilling and cementing fluid useful in the method of this invention. Deflocculants which are useful in the practice of this invention are those which do not precipitate from aqueous solution in the presence of calcium ions and which are rendered inactive upon exposure to temperatures above about 300° F. Deflocculants useful in the present invention include the class of compounds known as lignites, lignosulfonates and tannins. Metal lignosulfonates are the preferred deflocculant, and ferrochrome lignosulfonates are the most preferred metal lignosulfonates. The deflocculant is necessary to prevent the cement from setting and to control the viscosity and filtration rate of the fluid during drilling. The cement added to the drilling fluid of this invention has a tendency to cause flocculation of the mud component. The presence of a deflocculant functions to limit the flocculation caused by the cement and prevent the cement from setting during drilling. The amount of the deflocculant in the mud depends on the amount of cement present and the desired drilling fluid properties. The fluid must contain a deflocculant in an amount at least sufficient to prevent the cement from setting during drilling. The deflocculant may range from about 3 to about 60 pounds per barrel of mud component. Preferably, the deflocculant will be present in an amount ranging from about 6 to about 30 pounds per barrel.

Although the manner and sequence by which the components of the drilling fluid are mixed is not critical, it is preferred that the mud component first be prepared. Thereafter, it is preferred to simultaneously add the cement component and deflocculant in small increments to the mud solution to insure intimate admixture therewith.

Aqueous solubility in the presence of calcium ions and thermal deactivation of the deflocculant are essential properties of the deflocculant. Using the fluid of the invention as a drilling mud, a well is drilled to the desired depth, thereafter a casing is suspended in the well and cemented. By applying heat to the drilling fluid in place in the annulus, the deflocculant is deactivated, converting the fluid to a cement slurry, and the setting of the cement is effected. For example, metal lignosulfonates are deactivated at approximately 350° F. Tannins and lignites are deactivated at about 300° F. Thus, the deflocculant is irreversibly deactivated by exposure to heat, and the cement slurry is allowed to set.

Generally, the higher the temperature to which the drilling fluid is exposed and the longer the time of exposure, the greater the degree of deflocculant deactivation and the more rapidly the cement slurry will set. Therefore, the setting rate of the cement slurry may be controlled by regulating the temperature to which the drilling fluid is exposed and the duration of exposure.

In drilling operations the drilling fluid composition of this invention is used as the drilling mud. Thus, in rotary bit drilling the fluid is circulated through the well by pumping. The fluid is circulated down the drill pipe, past the bit and returned to the surface through the well annulus. The fluid lifts formation cutting to the surface, cools the drill bits, and seals the formation against fluid circulation losses, and prevents formation fluids infiltration. After the well has been drilled to the desired depth and the casing has been suspended in the well, the fluid may be converted to cement by application of extrinsic heat.

It will not usually be desired to have the cement set within the casing. It is therefore necessary to remove the thermally activatable cement from the casing interior before heating the fluid in place in the annulus of the well. As in conventional cementing operations, this may be accomplished by pumping a cementing plug down hole using a non-thermal setting fluid. When the plug reaches the bottom, it is stopped by the cementing shoe and leaves non-setting fluid in the interior.

After the convertible fluid is removed from the interior of the casing, the thermal activation of the drilling fluid in place in the well annulus to convert it into a settable cement slurry is accomplished by exposing such fluid to heat. Preferably, heat is applied by means of the heater tool shown in FIGS. 1 and 2. In FIG. 1, heater tool 1 is shown suspended from drill pipe 2 and packer 3. Heater tool 1 is run down hole through casing 4 to heat drilling fluid 5, thereby converting it into a settable cement slurry. Heater tool 1 is maintained in axial alignment in the casing by means of centralizer 6. Preferably, centralizer 6 is made of a conductive material which aids in conducting heat through casing 4 into drilling fluid 5. Packer 3 prevents heated fluid from rising above the zone desired to be heated.

FIG. 2 illustrates a cutaway section of heater tool 1. Heater tool 1 comprises centralizer 6 and heating coil 7. Heat is applied to casing 4 and drilling fluid 5 at a controlled temperature rate by means of thermocouple wire 8, thermocouple junction 9, and switch 10. Power is supplied to heater tool 1 by means of electrical cable 11.

EXAMPLE 1

A laboratory test was conducted to demonstrate the the method and the utility of the fluid of this invention as a drilling mud which is convertible by extrinsic heat to a settable cement slurry. Ten pounds per barrel of Class H cement and 6 pounds per barrel of ferrochrome lignosulfonate, obtained from NL Baroid under the trademark Q-Broxin, were added to a typical 14 pound per gallon fresh water field mud. The rheological properties of this mud before and after aging at 300° F. for 16 hours are shown in Table I. This data demonstrates that this fluid will survive the temperatures encountered in drilling most wells while retaining the rheological properties required for service as a drilling mud.

TABLE I

|  | Before Aging | After Aging |
| --- | --- | --- |
| plastic viscosity, centipiose | 13 | 13 |
| yield point, lb/100 ft.$^2$ | 3 | 13 |

The same fluid was then heated to 400° F. for 16 hours and the fluid solidified. The compressive strength of this cementitious mass was measured to be a little over 100 psi. By adjusting the cement composition and selecting the proper thinner and heating temperatures, a cement with even higher compressive strength may be obtained.

While we have described the method and slurry of our invention above, many other variations will occur to those skilled in the art. It is intended that all such variations which fall within the scope of the appended claims be embraced thereby.

We claim:

1. A method of drilling and cementing a well using a drilling fluid thermally convertible in place into a settable cement slurry, comprising:
    drilling a well with a rotary bit through which an aqueous drilling fluid is circulated, said fluid comprising an aqueous drilling mud containing in intimate admixture therewith cement and a deflocculant which is deactivatable upon exposure to heat;
    suspending a casing in said well;
    removing said fluid from inside said casing; and
    applying sufficient extrinsic heat to said fluid in place within the well annulus to deactivate said deflocculant, thereby converting said fluid in place into a settable cement slurry.

2. The method according to claim 1, wherein said deflocculant is deactivatable on exposure to temperatures above about 300° F.

3. The method according to claim 2, wherein said deflocculant is present in an amount ranging from about 3 to about 60 pounds per barrel of said fluid.

4. The method according to claim 2, wherein said cement is present in an amount ranging from about 2 to about 100 pounds per barrel of said fluid.

5. The method according to claim 2, wherein said deflocculant is selected from a group consisting of lignites, lignosulfonates and tannins.

6. A method of drilling and cementing a well using a drilling fluid thermally convertible in place into a settable cement slurry, comprising:

drilling a well with a rotary bit through which an aqueous drilling fluid is circulated, said fluid comprising an aqueous drilling mud containing in intimate admixture therewth (i) cement in an amount ranging from about 2 to about 100 pounds per barrel of said fluid and (ii) a deflocculant in an amount ranging from about 3 to about 60 pounds per barrel of said fluid, said deflocculant being deactivatable upon exposure to temperatures above about 300° F.;

suspending a casing in said well;

removing said fluid from inside said casing; and applying sufficient extrinsic heat to said fluid in place within the well annulus to deactivate said deflocculant, thereby converting said fluid in place into a settable cement slurry.

7. The method according to claim 6, wherein said deflocculant is present in an amount ranging from about 6 to about 30 pounds per barrel of said fluid.

8. The method according to claim 7, wherein said deflocculant is a metal lignosulfonate.

9. The method according to claim 6, wherein said cement is present in an amount ranging from about 5 to about 50 pounds per barrel of said fluid.

10. A method of drilling and cementing a well using a drilling fluid thermally convertible in place into a settable cement slurry, comprising:

drilling a well with a rotary bit through which an aqueous drilling fluid is circulated, said fluid comprising an aqueous drilling mud containing in intimate admixture therewith (i) cement in an amount ranging from about 5 to about 50 pounds per barrel of said fluid and (ii) a metal lignosulfonate present in an amount ranging from about 6 to about 30 pounds per barrel of said fluid;

suspending a casing in said well;

removing said fluid from inside said casing; and applying sufficient extrinsic heat to said fluid to deactivate said metal lignosulfonate, thereby converting said fluid in place into a settable cement slurry.

11. The method according to claim 10, wherein said metal lignosulfonate is a ferrochrome lignosulfonate.

12. The method of claim 11, wherein said extrinsic heat is supplied by lowering a heater tool into said casing to a depth adjacent to the formation to be cemented and applying heat in excess of 300° F.

* * * * *